July 19, 1960
W. A. PAULSON
2,945,393
POWER OPERATOR
Filed Jan. 26, 1956
2 Sheets-Sheet 1
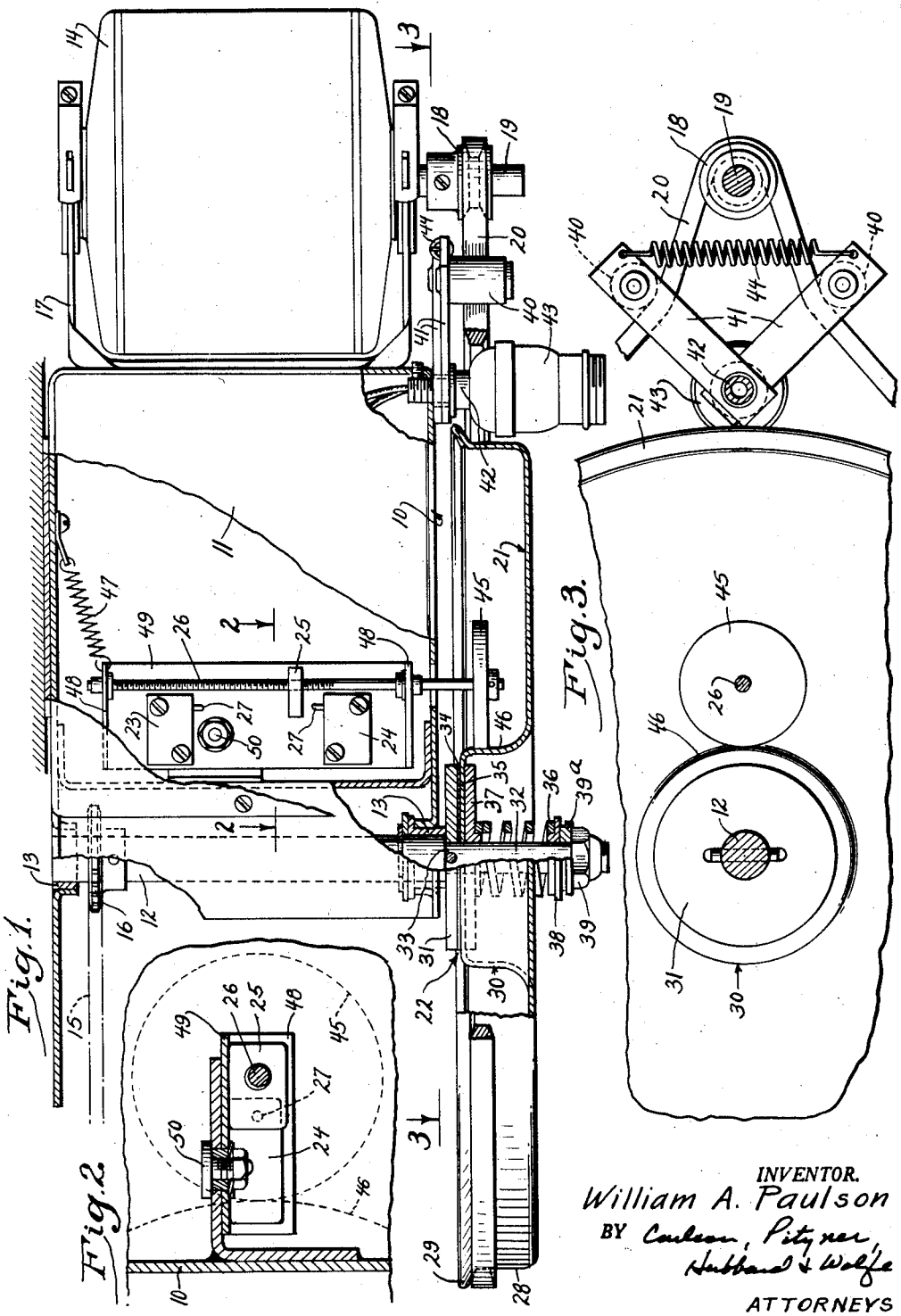
INVENTOR.
William A. Paulson
BY Carlson, Pityner,
Hubbard & Wolfe
ATTORNEYS

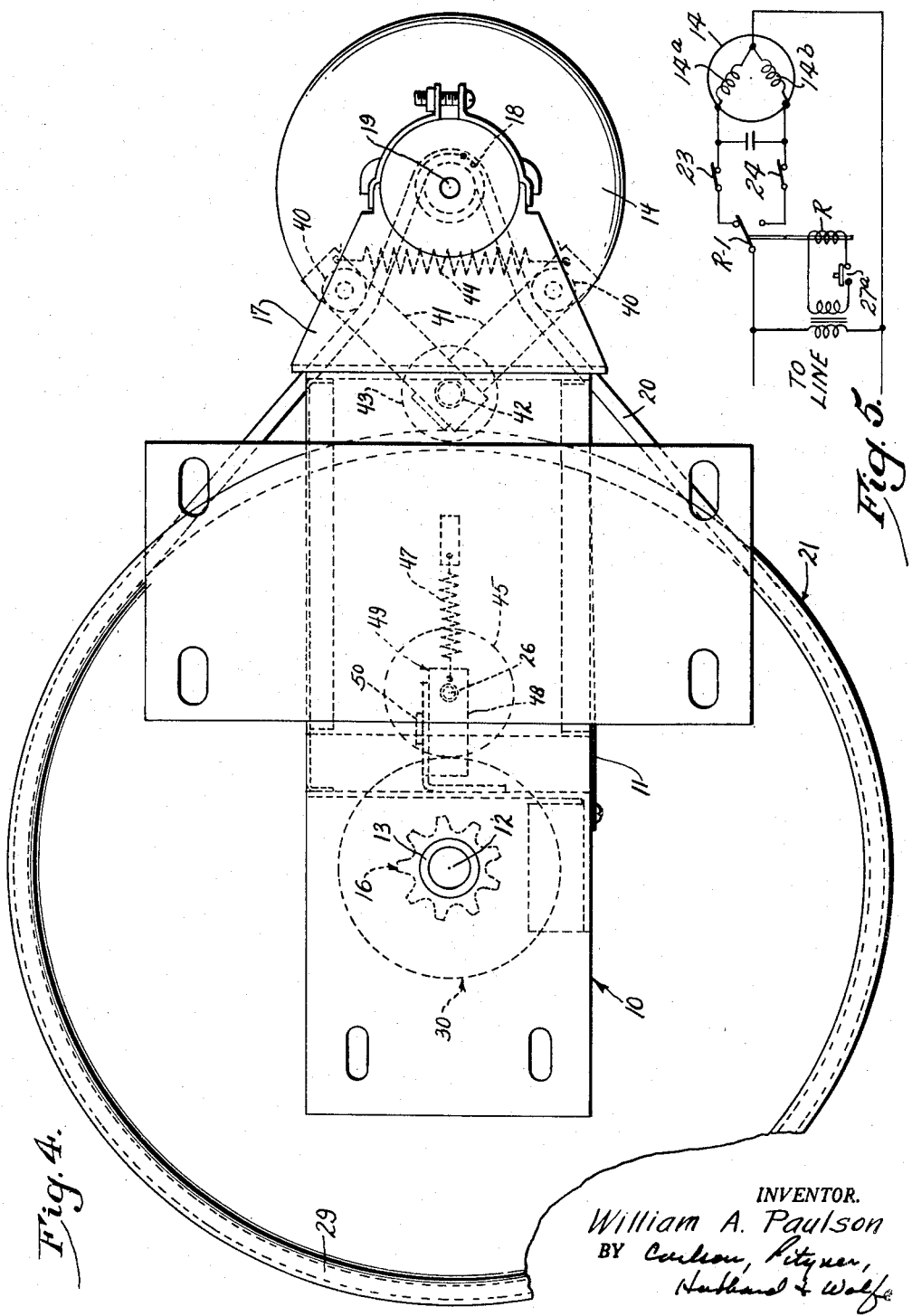

United States Patent Office 2,945,393
Patented July 19, 1960

2,945,393
POWER OPERATOR

William A. Paulson, Rockford, Ill., assignor to Barber-Colman Company, Rockford, Ill., a corporation of Illinois Filed Jan. 26, 1956, Ser. No. 561,428

3 Claims. (Cl. 74—472)

This invention relates to a power operator of the type in which a shaft is turned by a motor through pulleys and a belt and in turn drives the part to be operated.

The general object of the invention is to provide a new and improved operator of the above character which, as compared to prior operators, is inexpensive to manufacture and yet is rugged in service use.

Another object is to simplify the manufacture through the use of a pulley which is constructed and arranged in a novel manner so that it may be formed from sheet metal.

A more detailed object is to facilitate the use of sheet metal by utilizing a portion of the pulley as a clutch between the pulley and the shaft so that the pulley may be mounted on the shaft without the necessity of being secured thereto.

The invention also resides in the novel manner in which the pulley is used to control the actuation of the limit switches for the motor.

Other objects and advantages of the invention will become apparent from the following detailed description taken in connection with the accompanying drawings, in which—

Figure 1 is a fragmentary transverse sectional view of an operator embodying the novel features of the present invention.

Fig. 2 is a fragmentary sectional view taken along the line 2—2 in Fig. 1.

Fig. 3 is a fragmentary sectional view taken along the line 3—3 in Fig. 1.

Fig. 4 is a plan view.

Fig. 5 is a wiring diagram which may be used in connection with the control of the operator.

As shown in the drawings for purposes of illustration, the invention is embodied in a power operator used to move a member, such as a garage door of the overhead type, back and forth, for example, to open and close the door. The parts of the operator are mounted on a frame 10 closed by a cover 11 and include an output or driven shaft 12 journaled on the frame in spaced bearings 13. The shaft is driven by a reversible motor 14 and is connected to the part to be driven by a chain 15 which extends around a sprocket wheel 16 fast on the shaft, the wheel thus constituting a power take-off means. The motor is supported by a bracket 17 secured to the frame 10.

To drive the shaft 12 from the motor 14, a small pulley 18 is secured to the motor shaft 19 and is connected by means of a belt 20 to a substantially larger pulley 21. The latter is coupled to the output shaft by a friction clutch 22 which thus completes the drive between the motor and the shaft.

Two spaced limit switches 23 and 24 control the motor 14 and are actuated by a nut 25 which is threaded on an elongated rotary screw 26 and held against turning. The screw is turned simultaneously with the shaft 12 and in a corresponding direction. As a result, the nut 25 travels along the screw in a direction correlated with the direction the shaft turns and eventually engages the actuator 27 of one or the other of the switches 23 and 24 and this deenergizes the motor and stops the shaft.

The switches 23 and 24 may control the motor 14 in any well known manner. For example, as shown in Fig. 5, each switch may be in the circuit of one of the coils of the motor and the coils 14$^a$ and 14$^b$ are connected selectively across a suitable source of alternating current through their respective switches by a double throw switch R–1 which is part of a relay R. The latter is of the latching or ratchet type and reverses position of the switch R–1 each time the relay is momentarily energized as by closing a manual switch 27$^a$ in the circuit of the relay. Thus, with the parts in the position shown in the drawings, the motor is turning in a direction to advance the nut toward the switch 23 which, when opened, deenergizes the motor. The next time the manual switch 27$^a$ is closed, the switch R–1 completes the circuit of the coil 14$^b$ to drive the motor in the opposite direction until the nut opens the switch 24. The switch 23 closes as the nut moves away so that the circuit of the coil 14$^a$ is conditioned for the next actuation of the manual switch.

In accordance with one aspect of the invention, the pulley 21 is constructed, mounted on the shaft 12 and arranged to cooperate with the clutch 22 in a novel manner so that it may be made very inexpensively from sheet metal as by a spinning or a stamping operation. This is achieved by forming the pulley as a part of the clutch so that the pulley may be mounted freely on the shaft 12 and need not be keyed or otherwise secured to the latter. At the same time, the arrangement of the clutch and associated parts results in the pulley being held securely in place to transmit the power from the motor 14 to the shaft 12.

To accomplish the ends enumerated above, the pulley 21 is formed from a sheet metal disc whose outer peripheral edge portion is bent laterally to form a cylindrical flange 28 about which the belt 20 is wound. The extreme edge 29 of the flange may, as shown, be bent outwardly and then doubled back to form a finished edge and to prevent the belt from slipping off the flange 28. The central portion of the disc is turned in, in the same direction as the flange 28, to form a cylindrical hub 30. One important function performed by the hub is to impart an overall rigidity to the pulley.

In order to eliminate the necessity of securing the pulley 21 to the shaft 12 and to simplify the resulting construction further, a portion of the hub 30 is utilized as one element of the clutch 22 and frictionally engages another element 31 which is fast on the shaft. Herein, the element 31 is a flat circular disc slipped onto the reduced end portion 32 of the shaft against a shoulder 33 and pinned to the shaft. The face of the disc 31 is covered with a layer 34 of friction material which engages the circular end 35 of the hub, this end thus constituting the other clutch element.

The pulley 21 is loosely received on the end portion 32 of the shaft 12 and is held in place with the hub end 35 engaging the disc 31 by a coil compression spring 36. The latter encircles the shaft portion 32 within the hub 30 and acts between a flat plate 37 abutting against the inside of the hub end and an abutment 38 on the end of the shaft. The abutment 38 may be a washer held on the shaft by a nut 39 threaded onto the end of the shaft. The nut provides a means for adjusting the force of the spring and hence the frictional force between the clutch elements. The plate 37 serves as a backing member for the end 35 of the hub 30 and keeps this end flat for full face engagement with the disc 31. Between the nut 39 and the washer 38 is a lubricated porous bronze bearing 39a. Because the latter is lubricated and small in diameter, it prevents power from being transmitted from the pulley 21 to the shaft 12 through the plate 37 and the spring 36 so that all the power is transmitted through the clutch 22.

Under some circumstances, the part being driven by the shaft 12 may strike an obstruction while the motor 14 still is energized. In order that, in such a case, the clutch 22 slips instead of the belt 20, means is provided to increase the friction between the belt and the small driving pulley 18. This means, in this instance, comprises idler rollers 40 which engage the belt between the pulleys 18 and 21 and bend the belt in as shown in Fig. 4 so that the belt contacts a substantial portion of the periphery of the small pulley 18. In the illustrated form, the belt contacts almost 180 degrees of the pulley periphery so that the friction between the two is increased appreciably over what it would be in the absence of the rollers 40.

The rollers 40 are journalled on the outer ends of horizontal arms 41 whose inner ends are pivotally mounted on the frame 10. In the present instance, the arms are pivoted on the conduit 42 leading to a lamp socket 43 which may conveniently be mounted on the frame. The arms project outwardly in opposite directions so that one roller is disposed on each side of the belt 20 and a contractile spring 44 urges the arms together so that the rollers bend the belt in.

In order to turn the screw 26 in synchronism with the shaft 12, the screw is turned by the pulley 21 through a friction drive. For this purpose, advantage is taken of the presence of the hub 30 by disposing the screw 26 generally parallel to the shaft 12 with an end portion of the screw alongside the hub and by securing a friction drive wheel 45 to this end portion. The wheel engages the side 46 of the hub and thus is turned by the pulley 21.

To hold the wheel 45 firmly against the hub 30, the screw 26 is supported for limited movement on the frame 10 and is biased by a spring 47 in a direction to urge the wheel into frictional engagement with the side 46 of the hub. Herein, the screw is journaled in spaced flanges 48 on a vertical bracket 49 which is pivoted at 50 to the frame. The axis of the pivot 50 extends transversely of the shaft 12 so that, as the bracket 49 is turned about the pivot, the wheel 45 is swung toward and away from the hub 30. The spring 47, which is of the contractile type, has one end hooked to the upper end of the bracket and the other end to the frame whereby the spring tends to turn the bracket clockwise as viewed in Fig. 1 and urges the wheel 45 into frictional engagement with the hub.

Preferably, the limit switches 23 and 24 also are mounted on the bracket 49 to maintain a constant relation between their actuators 27 and the nut 25. The latter, as illustrated in Fig. 2, has a flat edge which slides along the bracket and prevents the nut from turning. With this arrangement, turning the shaft 12 in one direction turns the screw 26 in a corresponding direction. As a result, the nut travels along the screw toward one of the switches, for example the switch 23. When the nut engages the actuator of this switch, the motor 14 is deenergized stopping the shaft 12. When the motor is reversed to turn the shaft in the opposite direction, the screw also turns in the opposite direction so that the nut travels toward the switch 24 which, when actuated, again deenergizes the motor.

I claim as my invention:

1. In a power operator, the combination of, a frame, a driven shaft journaled on said frame, a pulley connected to said shaft and having a hub with a peripheral surface concentric with the shaft, a motor operable to turn said pulley and thereby turn said shaft, a member pivotally mounted on said frame to turn about an axis extending transversely of said shaft, an elongated rotary element journaled on said member and disposed generally parallel to said shaft with an end portion of the element disposed alongside said hub, a wheel secured to said end portion, a spring acting between said frame and said member and urging said member to turn about said axis in a direction to hold said wheel in frictional engagement with said hub surface whereby said pulley turns said element, and a device responsive to turning of said element and operable to control the actuation of said motor.

2. In a power operator, the combination of, a frame, a driven shaft journaled on said frame, a pulley connected to said shaft and having a hub with a peripheral surface concentric with the shaft, a motor operable to turn said pulley and thereby turn said shaft, a member pivotally mounted on said frame to turn about an axis extending transversely of said shaft, a screw journaled on said member and generally paralleling said shaft with an end portion disposed alongside said hub, a wheel secured to said end portion, a spring acting between said frame and said member and urging said member to turn about said axis in a direction to hold said wheel in frictional engagement with said hub surface whereby said pulley turns said screw, a switch mounted on said member and operable to control said motor, and a nut threaded on said screw and held against turning to advance along the screw and actuate said switch.

3. In a power operator, the combination of, a frame, a driven shaft journaled on said frame, a first pulley connected to said shaft, a motor, a driving pulley connected to said motor to be turned by the latter and alined with said first pulley, a belt connecting said pulleys whereby said shaft is turned by said driving pulley, a member pivotally supported on said frame, a rotary element journaled on said member and having a portion extending alongside a part of said first pulley, a wheel fast on said portion, a spring acting between said frame and said member and urging said member to turn about its pivot in a direction to hold said wheel in frictional engagement with said first pulley thereby to turn said element, and a control device operated by turning of said element and effective to control the actuation of said motor.

References Cited in the file of this patent

UNITED STATES PATENTS

| | | |
|---|---|---|
| 283,572 | Codding | Aug. 21, 1883 |
| 508,947 | Kleinstiver | Nov. 21, 1893 |
| 596,281 | Spaulding | Dec. 28, 1897 |
| 1,414,513 | Hueber | May 2, 1922 |
| 2,052,125 | Brady | Aug. 25, 1936 |
| 2,066,721 | Easton | Jan. 5, 1937 |
| 2,086,830 | Thompson | July 13, 1937 |
| 2,441,505 | Ochtman | May 11, 1948 |
| 2,482,464 | Chapman | Sept. 20, 1949 |
| 2,547,666 | Schneider | Apr. 3, 1951 |